US006203031B1

(12) United States Patent
Leverington

(10) Patent No.: US 6,203,031 B1
(45) Date of Patent: Mar. 20, 2001

(54) FILE CABINET DOLLY WITH OPEN FRAME

(75) Inventor: James M. Leverington, Marshalltown, IA (US)

(73) Assignee: SteelWorks, Inc., Des Moines, IA (US)

( * ) Notice: Subject to any disclaimer, the term of this patent is extended or adjusted under 35 U.S.C. 154(b) by 0 days.

(21) Appl. No.: 09/206,624

(22) Filed: Dec. 7, 1998

(51) Int. Cl.$^7$ .................................................. B62B 1/00
(52) U.S. Cl. ........................................ 280/35; 280/79.3
(58) Field of Search ................................ 280/638, 79.11, 280/35, 43.24, 79.3, 659, 79.2; 403/292, 294, 353; 5/201, 202, 184

(56) References Cited

U.S. PATENT DOCUMENTS

| Re. 29,029 | * | 11/1976 | Harris ................................... 5/202 X |
| 1,300,533 | | 4/1919 | Wessinger . |
| 1,595,007 | | 8/1926 | Kindrat . |
| 1,999,172 | | 4/1935 | De Boer . |
| 2,567,619 | * | 9/1951 | Rosenfeld ............................... 5/201 |
| 2,683,610 | | 7/1954 | Brown . |
| 2,939,157 | | 6/1960 | Roche . |
| 2,990,191 | | 6/1961 | Black . |
| 3,100,314 | * | 8/1963 | Brandelin et al. ....................... 5/202 |
| 3,331,613 | | 7/1967 | Popelka . |
| 3,744,068 | * | 7/1973 | Harris .................................. 5/202 X |
| 3,775,783 | * | 12/1973 | Miller .................................. 5/201 X |
| 3,831,959 | | 8/1974 | Fontana . |
| 4,166,638 | * | 9/1979 | DePrado .............................. 280/638 |
| 4,225,265 | * | 9/1980 | Hooker et al. ....................... 403/353 |
| 4,720,115 | * | 1/1988 | Rehrig ............................... 280/79.11 |
| 4,822,066 | * | 4/1989 | Rehrig ............................... 280/79.11 |
| 4,934,720 | * | 6/1990 | Dobron .............................. 280/79.11 |
| 5,299,817 | * | 4/1994 | Chang .................................. 280/35 |
| 5,469,999 | | 11/1995 | Phirippidis . |
| 5,599,031 | * | 2/1997 | Hodges ............................. 280/79.11 |

FOREIGN PATENT DOCUMENTS

406206545 * 7/1994 (JP) .................................. 280/79.11

* cited by examiner

Primary Examiner—Brian L. Johnson
Assistant Examiner—Bryan Fischmann
(74) Attorney, Agent, or Firm—Ryndak & Schwartz

(57) ABSTRACT

A file cabinet dolly is provided that includes an adjustable rectangular frame. The rectangular frame is composed of a pair of tabbed rails on opposed frame sides in combination with a pair of slotted rails that are in interlocking engagement with each other.

16 Claims, 4 Drawing Sheets

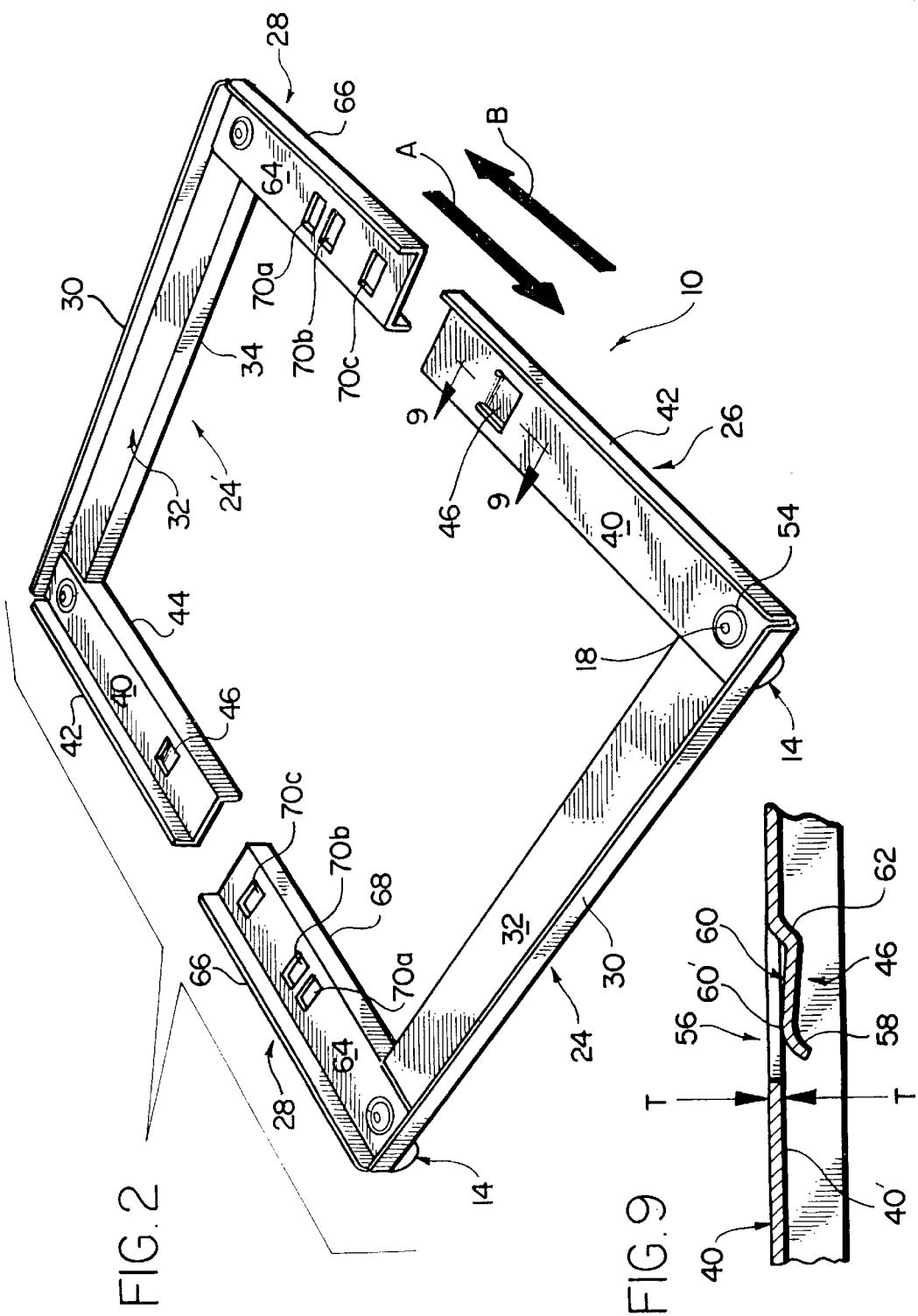

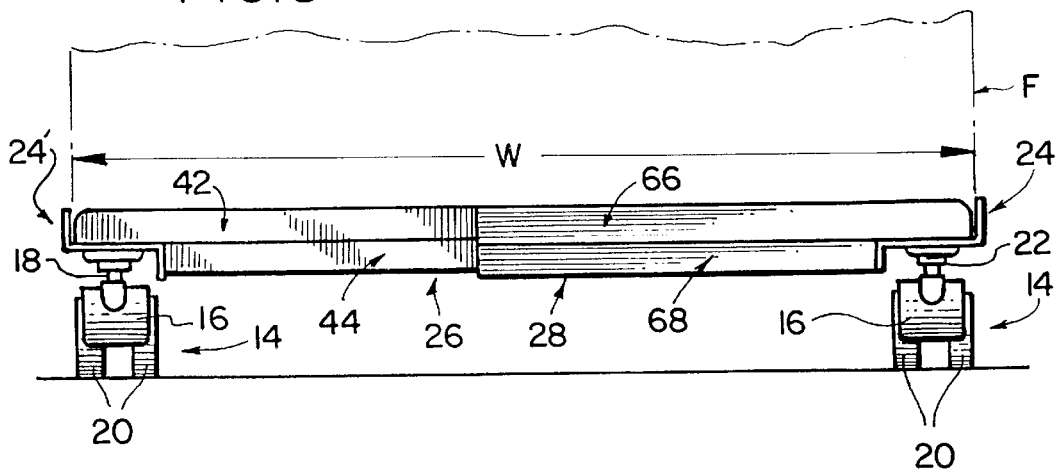
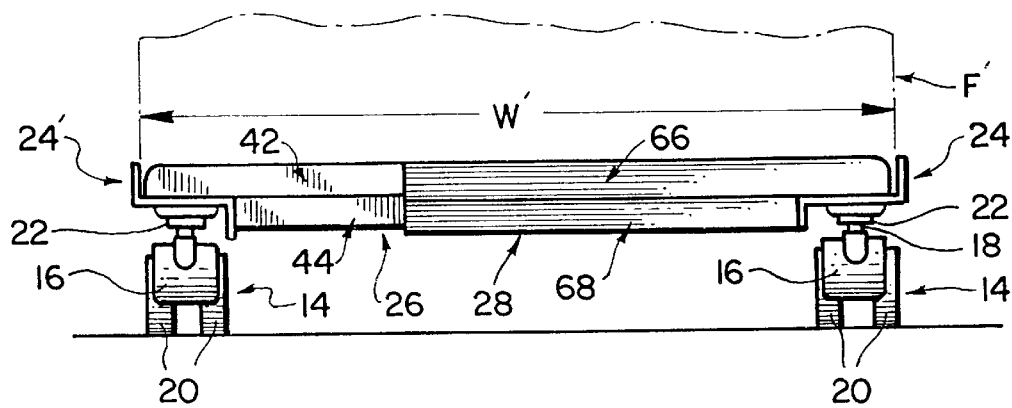
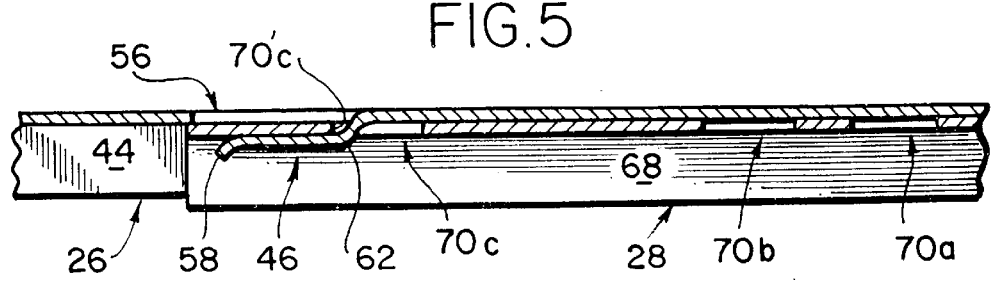
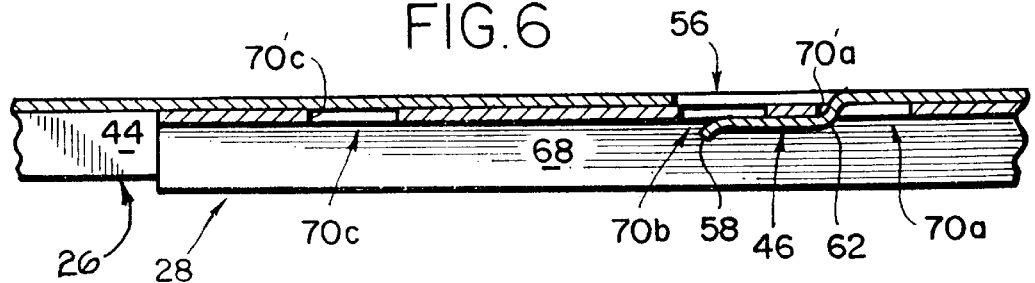

FILE CABINET DOLLY WITH OPEN FRAME

FIELD OF THE INVENTION

The present invention relates to dollies for file cabinets and more particularly to file cabinet dollies that are adjustable to accommodate different width file cabinets.

BACKGROUND OF THE INVENTION

File cabinets are well-known useful devices for storing and organizing materials, particularly various types of files. File cabinets come in different styles but generally have a flat bottom, top and sides and have 2, 3, 4 or more drawers or compartments. A device of such a shape and size is rather cumbersome to move. Moreover, even a two-drawer legal or letter size file cabinet that is substantially filled with files is surprisingly heavy, making such a filled file cabinet very difficult and awkward for one person to move without assistance.

Various devices are known to transport articles, including file cabinets. One type of file cabinet dolly is known which, although adjustable, requires the use of nuts and bolts and tools to adjust for different width file cabinets. In addition, the frame pieces which define the rectangular open frame are welded at the corners and thus relatively expensive to manufacture.

A file cabinet dolly or caddy is needed which is simple in design, economical to construct, easy to assemble and which can be easily adjusted to accommodate different size file cabinets without the use of tools.

SUMMARY OF THE INVENTION

In accordance with the present invention, a file cabinet dolly is provided that includes an adjustable rectangular frame to accommodate different size file cabinets. The rectangular frame has four sides and in one embodiment is composed of a peripheral vertical edge flange portion and a generally horizontal web projecting interiorly from the flange portion. The rectangular frame is adjustable at least along two opposed frame sides to accommodate different file cabinet widths and includes two tabbed rails, located on the two adjustable opposed frame sides, each tabbed rail having a tab extending therefrom, and two slotted rails, located on the opposed frame sides and cooperating with the tabbed rails to provide adjustability. Each slotted rail preferably has a plurality of slots with the tab disposed in one of the slots when the frame is fully assembled. Each slot is complementary to said tab to permit each tab to be secured into one of such slots so that said tab rails and slotted rails define a desired frame extent (e.g. width) on opposed sides of said rectangular frame. In another embodiment, the slotted rails have only one slot and the frame is not adjustable.

The dolly includes structure for permitting low resistance movement of the dolly over a surface. Preferably, that structure is composed of a castor mounted at each corner of the rectangular frame.

In accordance with another aspect of the invention, the tabs have a spring-like action and removably lock into a respective one of the slots.

In accordance with another aspect of the invention, the tabbed rails and the slotted rails are in overlapping and interlocking engagement.

In accordance with still another aspect of the invention, the castor located at each corner of the rectangular frame includes a castor stud and the castor studs fasten the straight rails to the tabbed and slotted rails in combination with fastening structure associated with the castor studs, which may be a push nut, for example, to secure each stud relative to the rails associated with such stud.

BRIEF DESCRIPTION OF THE DRAWINGS

FIG. 2 illustrates a partially exploded perspective view of the file cabinet dolly of FIG. 1 illustrating adjustment for different file cabinet width;

FIG. 3 is a front elevation view of the file cabinet dolly of FIG. 1 adjusted for a wide width file cabinet;

FIG. 4 illustrates a front elevation view of the file cabinet dolly of FIG. 1 adjusted for a narrow width file cabinet;

FIG. 5 illustrates a cross sectional elevational view along lines 5—5 of FIG. 1 of tabbed and slotted rails in interlocking engagement to provide the file cabinet dolly width as illustrated in FIG. 3;

FIG. 6 illustrates a front sectional elevation view of the tabbed and slotted rails interlocked in position to provide a file cabinet dolly width as illustrated in FIG. 4;

FIG. 9 illustrates a fragmentary sectional elevation view of a tabbed rail in accordance with the invention along lines 9—9 of FIG. 2.

DETAILED DESCRIPTION OF THE INVENTION

Figure 1:
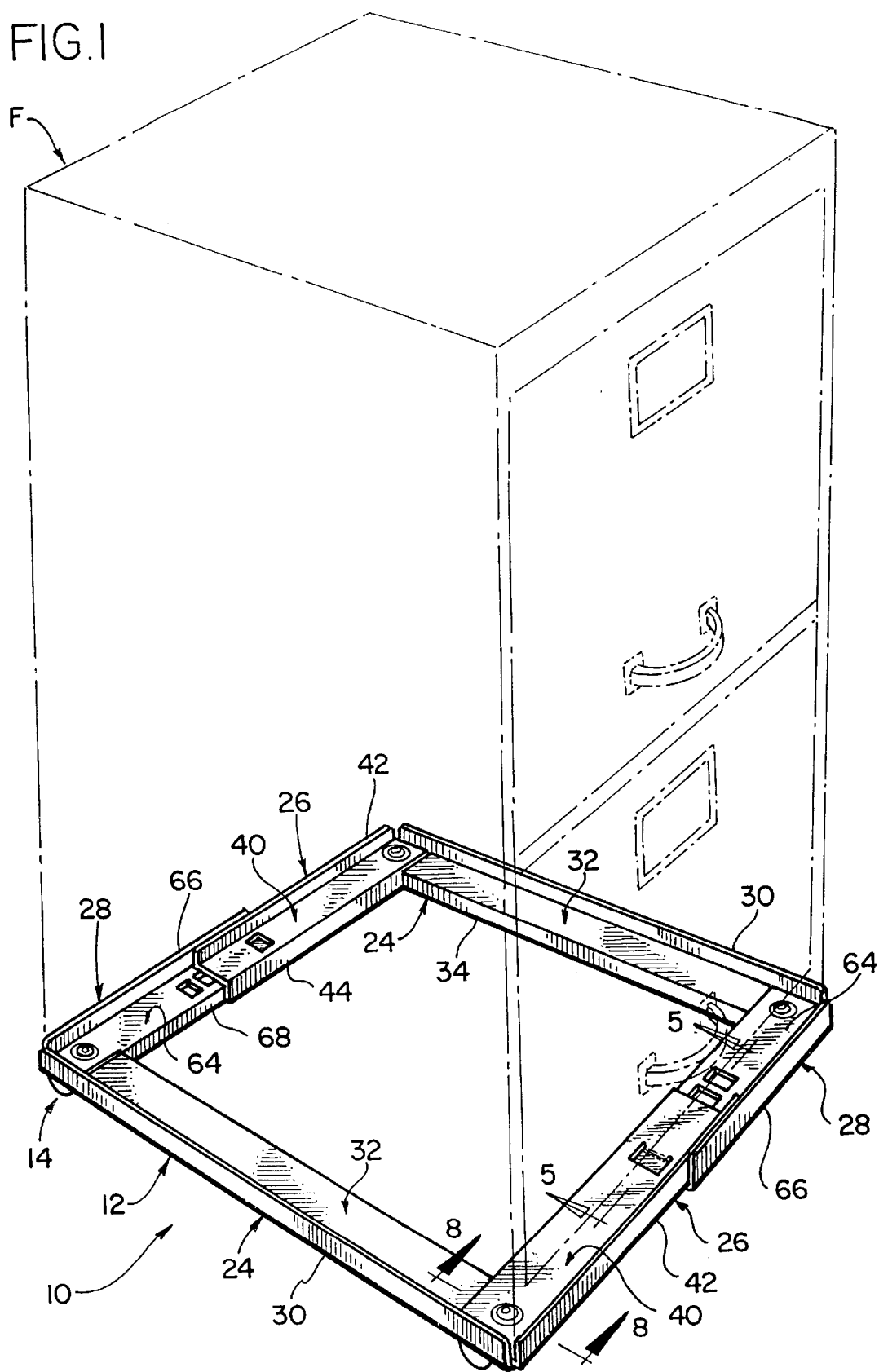
FIG. 1 illustrates a perspective view of a file cabinet dolly of the present invention.
Figure 7:
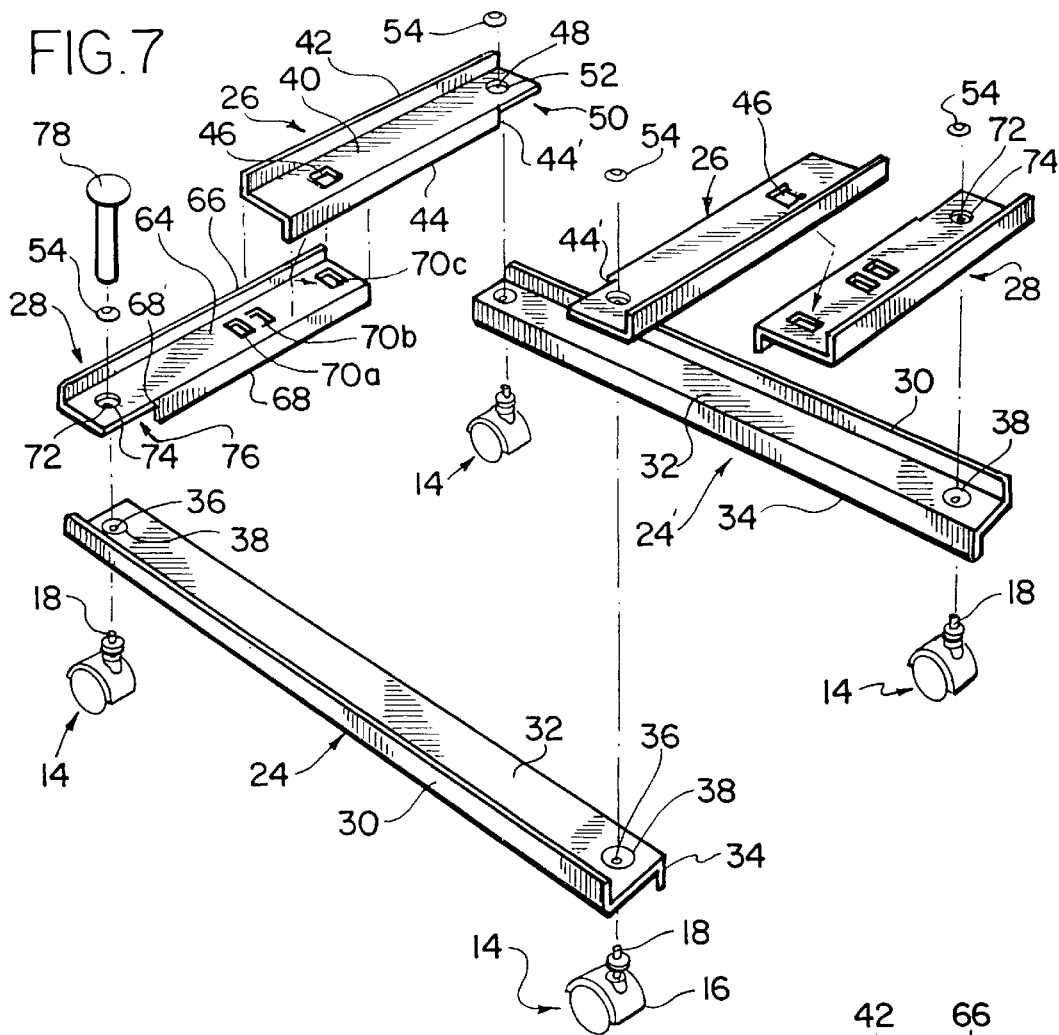
FIG. 7 illustrates an exploded perspective view of the file cabinet dolly of FIG. 1.

Referring to the drawings generally and in particular to FIGS. 1 and 7, there is illustrated a file cabinet dolly 10 in accordance with the present invention. File cabinet dolly 10 is composed of an adjustable rectangular frame 12. Rectangular frame 12 is adjustable to permit accommodation of file cabinets of various widths. As illustrated in FIG. 1, file cabinet dolly 10 is supporting a file cabinet F, shown in phantom lines.

Figure 8:
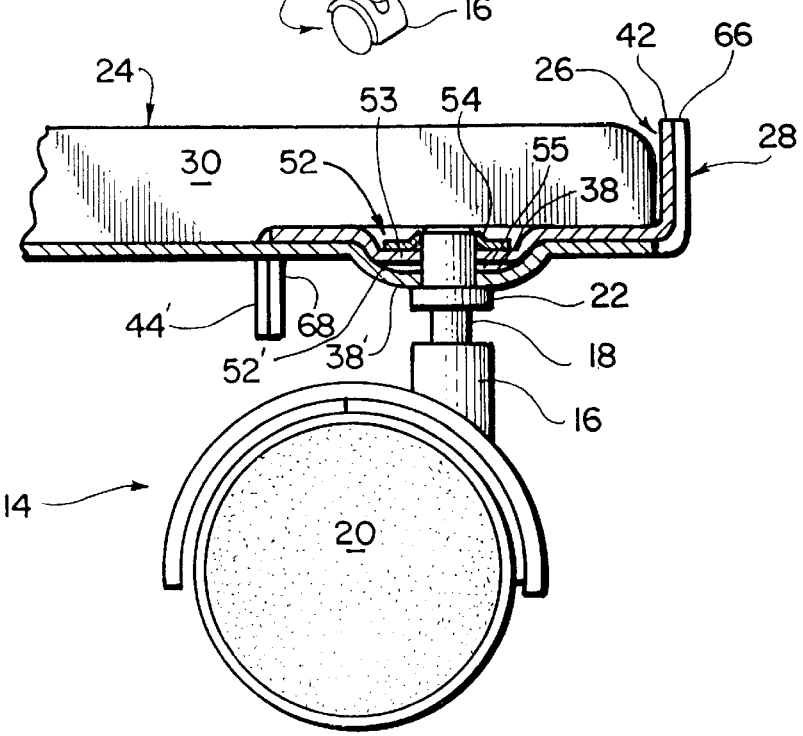
FIG. 8 illustrates a fragmentary sectional elevation view of the file cabinet dolly of FIG. 1 along the lines 8—8.

File cabinet dolly 10 includes structure for permitting low frictional resistance movement of dolly 10 over a surface, which, in this case, is composed of castors 14 mounted to rectangular frame 12, as hereinafter described. A separate castor 14 is located at each corner of rectangular frame 12. As shown in FIGS. 3, 7 and 8, each castor 14 includes a castor body 16, a flanged castor stud 18 and a pair of wheels 20. Flanged castor stud 18 is mounted to castor body 16 and includes a flange 22. Wheels 20 are rotatably mounted to castor body 16 to permit rolling movement over a surface. It is to be understood that any suitable type of castor may be utilized in accordance with the invention or some other type of structure that permits relatively low resistance movement of dolly 10 over a surface and is capable of supporting the desired load.

Rectangular frame 12 is composed of a pair of elongated straight rails 24, a pair of tabbed rails 26 and a pair of slotted rails 28.

Each elongated straight rail 24 includes an optional upwardly extending flange 30, a flat horizontal web portion 32 and a downwardly extending flange 34. Flanges 30 and 34 extend substantially along the entire length of elongated straight rail 24. Upwardly extending flanges 30, 42 and 66 maintain file cabinet F in position on dolly 10, particularly when a user exerts a horizontal force on file cabinet F so as to move file cabinet F and dolly 10 as a unit along a surface, such as a floor.

Elongated straight rail 24 also includes a pair of apertures 36, one aperture 36 being located towards each end of straight rail 24. Adjacent and surrounding apertures 36 is a generally bowl-shaped depression 38. Apertures 36 are dimensioned to accommodate insertion of the end of castor stud 18 which is smaller than the diameter of flange 22.

Tabbed rails 26 each consist of a flat, horizontal web portion 40, an upwardly extending flange portion 42 and a downwardly extending flange portion 44. Each tabbed rail 26 also includes a tab 46 and an aperture 48. Aperture 48 is intended to be placed in vertical relation over aperture 36 of elongated straight rail 24 at a right angle thereto. There is no downwardly extending flange portion in the area where tabbed rail 26 and slotted rail 28 overlap at a right angle to straight rail 24, as shown in FIG. 7 and indicated by reference numeral 50 and 76.

In addition, there is a depression 52 located around aperture 48 to accommodate insertion of a portion of flanged castor stud 18 and a push nut 54 which is secured over the end of, and cooperates with, flanged castor stud 18 to retain stud 18 and rails 24 and 26 in assembled overlapping relationship. Depression 52 in rail 26 permits the top of castor stud 18 and push nut 54 to be located at or beneath the height of web portions 32, 40 and 64 so as to not interfere with file cabinet F which rests on those web portions. A similar arrangement is provided by depression 74 of rail 28. A different type of fastener from push nut 54 may be utilized on castor stud 18, such as a threaded nut (in which case the end of castor stud 18 would be threaded), a snap ring (in which case the end of castor stud 18 would have a circumferential groove to accept the snap ring) or some other arrangement. Preferably, depressions 38 and 52 will be substantially complementary to permit nesting and are circular in shape, although a different shaped depression can be utilized in accordance with the invention. In the illustrated embodiment, depressions 38 and 52 are generally plate-shaped. As illustrated in FIG. 8, depression 52 nests within depression 38 and contacts depression 38 around the periphery thereof, thereby facilitating alignment of tabbed rail 26 with elongated straight rail 24 and providing additional structural rigidity to assembled frame 12. In addition, depressions 52 and 74 have a centrally located flat section 53 which creates a gap 55 between the bottom of the depression (for example protrusion 52' of depression 52) and the top of depression 38, as illustrated in FIG. 8. Depressions 52 and 74 are of the same configuration and thus depression 74 nests similarly within depression 38 (not shown in detail), with a gap therebetween similar to gap 55. Gap 55 is about 0.80 inches in height. A structural truss-like effect is created between depressions 38 and 52 and between depressions 38 and 74, thereby strengthening dolly 10 at the corners.

In the illustrated embodiment, tab 46 is integrally formed in flat horizontal web portion 40 of tabbed rail 26. Alternatively, tab 46 can be formed in upwardly extending flange portion 42 or downwardly extending flange portion 44 of tabbed rail 26, in which case tab 46 would be narrower since flange portions 42 and 44 are narrower than tab 46. The tab would be oriented relative to the flat portion of the flange portion from which it extends in a manner similar to tab 46 with respect to web portion 40 from which tab 46 extends.

Referring to FIG. 9, a cross-sectional view of tab 46 is illustrated. Tab 46 can be integrally formed from tabbed rail 26 by a stamping or other suitable process. Alternatively, tab 46 can be welded, riveted or otherwise attached to tabbed rail 26 by any suitable structure. Preferably, tab 46 is integrally formed from flat horizontal web portion 40 and thus the thickness of tab 46 will correspond generally to the thickness of flat horizontal web portion 40 as indicated by lines T—T in FIG. 9. It is desirable for tab 46 to exhibit a spring-like action when depressed and thickness T—T of flat horizontal web portion 40 generally will be in the range of from about 0.38 to about 0.70 inches.

Integral formation of tab 46 creates an opening 56 in the area that the material of tab 46 formerly occupied in horizontal web portion 40 prior to fabrication thereof.

Preferably, tab 46 has a terminal curved downwardly extending portion 58 to facilitate insertion into a complementary slot as hereinafter described, a body portion 60 that is generally horizontal and may extend slightly upwardly as tab 46 extends from web 40 towards terminal portion 58. Tab 46 is connected to web portion 40 by a downwardly curved shank portion 62. Downwardly extending terminal portion 58 preferably extends beneath the bottom of web portion 40 a distance greater than the thickness of web portion 64 of slotted rail 28 to facilitate insertion of tab 46 therein. In addition, the vertical distance between topmost portion 60' of body 60 and bottom 40' of web 40 is preferably less than the thickness of web portion 64 of rail 28 (in the illustrated embodiment that vertical distance is about zero). Because of this configuration, tab 46 is deflected downwardly a distance of approximately the thickness of web portion 64 and thus tab 46 exerts a spring-like action against rail 28 when tab 46 is fully inserted into one of slots 70.

Slotted rails 28 include a flat horizontal web portion 64, an upwardly extending flange portion 66 and a downwardly extending flange portion 68. Slotted rails 28 also include a plurality of slots 70a, 70b and 70c that are longitudinally spaced apart along flat horizontal web portion 64. Each of slots 70a, 70b and 70c are dimensioned to receive tab 46 therein in inter-engaging locking position as shown in FIGS. 5 and 6, for example. Slots 70a, 70b and 70c also are located to define a desired width rail defined by the combination of tabbed rail 26 and slotted rail 28. Slots 70a, 70b and 70c could be reconfigured and located either in upwardly extending flange portion 66 or downwardly extending flange portion 68 provided that tab 46 would be located in a complementary position on its respective tabbed rail 26. Also, a smaller or larger number of slots could be utilized, as desired. If only a single slot was present in each slotted rail 28, frame 12 would not be adjustable by the tab/slot arrangement.

Slotted rail 28 also includes an aperture 72 at one end, which aperture 72 allow insertion therein of flanged castor stud 18. A depression 74 surrounds aperture 72 and is complementary to depression 38 thereby allowing the bottom of depression 74 to nest within depression 38.

The end of slotted rail 28 having aperture 72 is adapted to overlap rail 24 at a right angle with the end of elongated straight rail 24 when aperture 72 is aligned with aperture 36. The portion of slotted rail 28 that so overlaps does not have downwardly extending flange portion 68 therealong to permit the overlap, as identified by reference numeral 76.

Assembly and adjustment of file cabinet dolly 10 is easily accomplished. The initial assembly can be performed without any tools other than a set tool for push nut 54. Referring to FIG. 7, initial assembly includes placing tabbed rail 26 over and at a right angle to the right end aperture 36 of elongated straight rail 24, so that aperture 36 lines up with aperture 48. The protrusion 52' formed by depression 52' nests into depression 38 of elongated rail 24, thereby locating tabbed rail 26 relative to straight rail 24. The end of castor stud 18 is inserted through apertures 36 and 48 so that flange 22 abuts rail 24 in the area of protrusion 38' of depression 38, as shown in FIG. 8. Thereafter, push nut 54 is forced over the end of the castor stud 18, preferably with a set tool 78, so that castor stud 18 is fixed in position with flange 22 abutting protrusion 38'. Such an arrangement results in a secure and rigid attachment of tabbed rail 26 to elongated rail 24 by the cooperation of stud 18 and push nut 54, protrusion 52' with depression 38 and end 44' of downwardly extending flange portion 44 which abuts downwardly extending flange portion 34 of elongated rail 24. Slotted rail 28 is secured to the left end of elongated straight rail 24 in a similar manner as that described with respect to tabbed rail 26. Consequently, castor stud 18 is inserted through apertures 36 and 72 while rail 28 is at a right angle to rail 24 and push nut 54 is forced over the end of stud 18 while flange 22 abuts protrusion 38' to form a secure and rigid attachment between slotted rail 28 and elongated rail 24. Apertures 36 and 72 are only slightly larger than the diameter of stud 18 that is inserted therethrough, and preferably just large enough to receive that portion of stud 18 to provide maximum structural rigidity for frame 12. Preferably, the diameter of apertures 36 and 72 will be equal to or less than about 0.002 inches or larger than the diameter of the portion of stud 18 that is inserted therethrough to help insure structural rigidity. The cooperation of the various elements to form a secure and rigid attachment is similar to that described with respect to rails 24 and 26. End 68' of downwardly extending flange 68 abuts flange 34 of rail 24, thereby providing frame 12 with additional structural rigidity and resistance to twisting.

The other elongated rail 24' is mated to another tabbed rail 26 at the left end of rail 24 and to another slotted rail 28 at the right end of rail 24' as previously described with respect to rail 24 as illustrated in FIG. 7. The resulting structure which is formed is illustrated in FIG. 2.

Final assembly of dolly 10 now can be completed. Elongated straight rails 24 and 24', each having a slotted rail 26 and a tabbed rail 28 attached thereto as previously described, are placed in spaced apart parallel aligned relationship to each other. The alignment is such that slotted rail 26 and tabbed rail 28 attached to rail 24 are respectively aligned with the tabbed rail 28 and slotted rail 26 attached to elongated rail 24', as shown in FIG. 2. Tabbed rail 26 attached to rail 24 is placed over slotted rail 28 attached to rail 24'. More specifically, terminal portion 58 of tab 46 is placed into a desired one of slots 70a–c (such as 70c) and below web portion 64. Similarly, tab 46 of rail 26 attached to rail 24' is placed over and into a corresponding one of slots 70a–c (for example, 70c) of rail 28 which is secured to rail 24.

Next, by grasping rails 24 and 24' and exerting a force on rail 24 in the direction of arrow A in FIG. 2, and on rail 24' in the direction of arrow B in FIG. 2, tabs 46 of rails 26 slide underneath web portions 64 of rails 28 while tabs 46 are urged and deflected downwardly from web portion 40 a distance approximately equal to the thickness of web portions 64, which in the illustrated embodiment is the same as the thickness of web portion 40, as tabs 46 slide underneath web portions 64, until edge 70'c of slot 70c engages shank portion 62 of tab 46, as illustrated in FIG. 5, which defines the fully locked position for tab 46 in slot 70c. In that position, resistance to relative movement of tab 46 relative to web portion 64 is provided that prevents relative movement of rail 26 relative to rail 28. The downward deflection of tabs 46 when in the locked position provides the foregoing resistance to relative movement and thus, file cabinet dolly 10 is locked to a width W to accommodate file cabinet F of the same or slightly smaller width as illustrated in FIG. 3. Slots 70c and tabs 46 can be disengaged by applying a force to rails 24 and 24', respectively, in a direction opposite to arrows A and B of FIG. 2, which force is sufficient to overcome the resistance to movement provided by the relation of tabs 46 to slots 70c. In this manner, tabs 46 can be disengaged from slots 70c to permit adjustment of file cabinet dolly 10 to another width. For example, file cabinet dolly 10 can be narrowed to width W'; as shown in FIG. 4, to accommodate narrower file cabinet F'. Tabs 46 are placed into a locked position within slots 70a and against edge 70'a in a manner similar to that described with respect to slot 70c. As described by the foregoing, the width of file cabinet dolly 10 can be easily adjusted without the need of any tools.

Slots 70b define a third width intermediate widths W and W' when tabs 46 are secured therein as previously described with respect to slots 70a and 70c. Thus, slots 70a–c in combination with tab 46 determines the amount of overlap of rails 26 and 28 thereby defining the assembled width of file cabinet dolly 10.

While the invention has been described with respect to certain embodiments, it is to be understood that the invention is capable of numerous rearrangements, changes and modifications and such changes, modifications and rearrangements are intended to be within the scope of the following claims.

What is claimed is:

1. A file cabinet dolly comprising a rectangular frame having four sides and composed of a generally horizontal web, said rectangular frame being adjustable along two opposed parallel sides to accommodate different file cabinet widths and including two tabbed rails, each tabbed rail located on one of said two opposed frame sides and two slotted rails, each slotted rail located on one of two opposed frame sides corresponding to the opposed sides on which the tabbed rails are located, each slotted rail having a plurality of spaced apart slots defining different predetermined frame widths in combination with said tabbed rail, each tab having a terminal curved extending portion and a body that is generally horizontal and each slot complementary to said tab to permit each tab to be locked into one of the slots and defining, in combination with said tabbed rails, a connected pair of said slotted and tabbed rails defining a predetermined frame width of said opposed sides of said rectangular frame; and means for permitting low resistance movement of said dolly over a surface.

2. The file cabinet dolly of claim 1 wherein said means for permitting low resistance movement comprises a castor mounted at each corner of said rectangular frame.

3. The file cabinet dolly of claim 1 wherein said tabs lock into said slots.

4. The file cabinet dolly of claim 1 wherein each side of said frame includes a peripheral vertical edge flange portion.

5. The file cabinet dolly of claim 1 wherein each slotted rail has at least three spaced apart slots defining three different predetermined frame widths in combination with said tabbed rail.

6. The file cabinet dolly of claim 1 wherein said tabs provide a spring action to retain said tabs in said slots.

7. The file cabinet dolly of claim 1 wherein a portion of the tabbed rails and slotted rails overlap.

8. The file cabinet dolly of claim 1 wherein the tabbed rails and the slotted rails are in overlapping and interlocking engagement.

9. The file cabinet dolly of claim 1 wherein said rectangular frame comprises a pair of straight rails connecting at right angles to each connected pair of slotted and tabbed rails.

10. The file cabinet dolly of claim 9 wherein one end of each straight rail is secured to a different one of said tabbed rails and the other end of each straight rail is secured to a different one of said slotted rails.

11. The file cabinet dolly of claim 10 wherein said means for permitting movement comprises a castor located at each corner of said rectangular frame, said castor including a castor stud and fastening means for cooperating with said castor stud to fasten the straight rails to said tabbed and slotted rails.

12. The file cabinet dolly of claim 1 wherein a portion of each tabbed rail is located over said corresponding slotted rail.

13. The file cabinet dolly of claim 1 wherein the tab on each tabbed rail is integrally formed therein.

14. A file cabinet dolly comprising a rectangular frame having four sides and composed of a generally horizontal web, said rectangular frame being adjustable along two opposed parallel sides to accommodate different file cabinet widths and including two tabbed rails, each tabbed rail located on one of said two opposed frame sides and two slotted rails, each slotted rail located on one of two opposed frame sides corresponding to the opposed sides on which the tabbed rails are located, each slotted rail having a plurality of spaced apart slots defining different predetermined frame widths in combination with said tabbed rail, each slot complementary to said tab to permit each tab to be secured into one of the slots and defining, in combination with said tabbed rails, a connected pair of said slotted and tabbed rails defining a predetermined frame width of said opposed sides of said rectangular frame and said tabs provide a spring action to retain said tabs in said slots; and means for permitting low resistance movement of said dolly over a surface.

15. A file cabinet dolly comprising a rectangular frame having four sides and composed of a generally horizontal web, said rectangular frame being adjustable along two opposed parallel sides to accommodate different file cabinet widths and including two tabbed rails, each tabbed rail located on one of said two opposed frame sides and two slotted rails, said rectangular frame comprises a pair of straight rails connected at right angles to each connected pair of slotted and tabbed rails, one end of each straight rail is secured to a different one of said tabbed rails and the other end of each straight rail is secured to a different one of said slotted rails, each slotted rail located on one of two opposed frame sides corresponding to the opposed sides on which the tabbed rails are located, each slotted rail having a plurality of spaced apart slots defining different predetermined frame widths in combination with said tabbed rail, each slot complementary to said tab to permit each tab to be secured into one of the slots and defining, in combination with said tabbed rails, a connected pair of said slotted and tabbed rails defining a predetermined frame width of said opposed sides of said rectangular frame; and means for permitting low resistance movement of said dolly over a surface comprising a castor located at each corner of said rectangular frame, said castor including a castor stud and fastening means for cooperating with said castor stud to fasten the straight rails to said tabbed and slotted rails.

16. A file cabinet dolly comprising:

a rectangular frame having four sides and composed of four side members, each side member forming one of the sides of said frame, each side member having two end portions, each side member end portion secured to an end portion of another side member in an overlapping and right angle relationship to define said rectangular frame;

a castor stud located at each corner of said rectangular frame extending through and securing, with fastening means cooperating with said castor stud, said side member end portions together in said overlapping and right angle relationship; and a depression in an end portion of one of said side members and a substantially corresponding protrusion in an end portion of another one of said side members, where said castor stud extends through said end portions, said protrusion nesting in said depression when said end portion of said one side member is secured to said end portion of another side member, wherein said depression is generally bowl-shaped and each protrusion is generally plate-shaped resulting in a gap therebetween and creating structural rigidity between each depression and each protrusion.

* * * * *

UNITED STATES PATENT AND TRADEMARK OFFICE
CERTIFICATE OF CORRECTION

PATENT NO.    : 6,203,031 B1
DATED         : March 20, 2001
INVENTOR(S)   : James M. Leverington It is certified that error appears in the above-identified patent and that said Letters Patent is hereby corrected as shown below:

<u>Column 3,</u>
Line 18, delete "numeral" and insert therefor -- numerals --.

<u>Column 4,</u>
Line 66, delete "52'" second occurrence and insert therefor -- 52 --.

<u>Column 5,</u>
Line 34, delete "24" and insert therefor -- 24' --.

Signed and Sealed this

Twentieth Day of November, 2001

Attest:

*Nicholas P. Godici*

NICHOLAS P. GODICI
*Attesting Officer*      *Acting Director of the United States Patent and Trademark Office*